L. STURGES.
MILK CAN.
APPLICATION FILED NOV. 22, 1913.
1,161,266.
Patented Nov. 23, 1915.
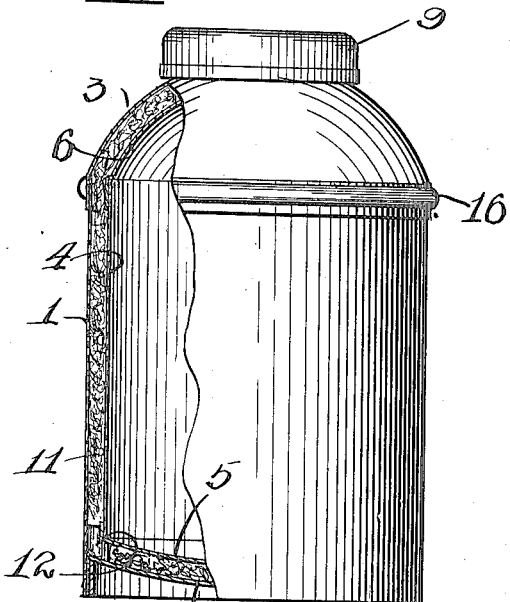
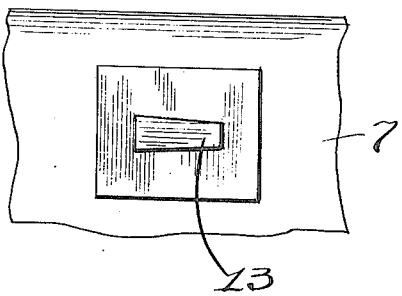
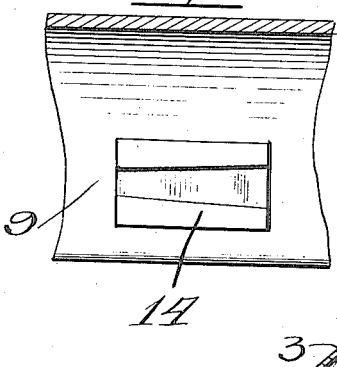
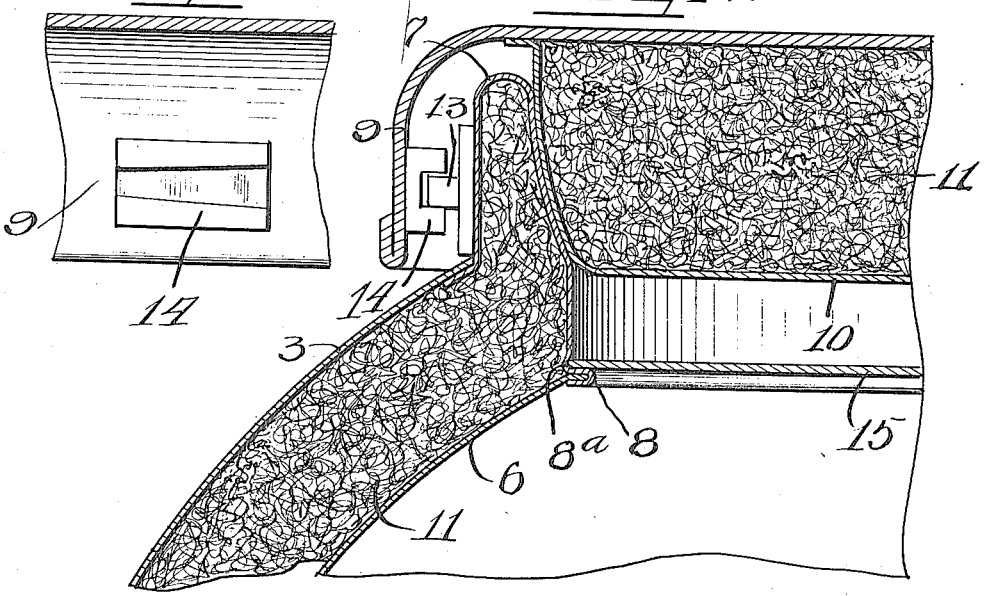
Witnesses
J. W. Angell
Charles Pitts Jr.
Inventor
Lee Sturges
by Charles O. Neill
Atty

UNITED STATES PATENT OFFICE.

LEE STURGES, OF CHICAGO, ILLINOIS.

MILK-CAN.

1,161,266. Specification of Letters Patent. Patented Nov. 23, 1915.

Application filed November 22, 1913. Serial No. 802,369.

*To all whom it may concern:*

Be it known that I, LEE STURGES, a citizen of the United States, and a resident of the city of Chicago, in the county of Cook and State of Illinois, have invented certain new and useful Improvements in Milk-Cans; and I do hereby declare that the following is a full, clear, and exact description of the same, reference being had to the accompanying drawings, and to the numerals of reference marked thereon, which form a part of this specification.

Milk and cream is often caused to spoil or become sour during the transfer thereof from place to place if the cans or receptacles containing the milk or cream, are not kept in a properly cooled place.

This invention relates to a milk can construction wherein suitable thermal insulation is provided associated with the can to protect the contents thereof from exterior temperature changes and to maintain the contents at substantially the same temperature as when placed within the can.

It is an object of this invention to construct a double walled milk can in which the space between said walls is filled with a non-conducting material serving to insulate the interior of the can from the various heat changes on the exterior thereof.

It is also an object of this invention to provide a milk can consisting substantially of two separate cans, one placed within the other and spaced therefrom, thus affording a construction capable of maintaining the contents within the inner can at substantially a constant temperature irrespective of exterior temperature conditions.

It is also an object of this invention to construct a thermally insulated can provided with an insulating cover adapted to be clamped tightly thereon and with means affording an insulating dead air space between the cover and the contents of the can.

It is also an object of this invention to provide a heat insulating container provided with an insulating cover curved to fit into a complementally curved opening in the container, such that inclination of the cover in the opening will not affect the sealing function thereof.

It is furthermore an object of this invention to construct a heat insulated container for milk or other fluids, provided with an insulated head or cover, adapted to be clamped in tight relation thereon to close the same.

It is finally an object of this invention to provide a thermally insulated container of simple construction to preserve the contents of the container at a constant predetermined temperature.

The invention (in a preferred form) is hereinafter more fully described and defined in the accompanying drawings and specification.

In the drawings: Figure 1 is a front elevation of a can partly broken away, and shown in section. Fig. 2 is an enlarged, fragmentary sectional view of the upper portion of the device, illustrating the construction in detail. Fig. 3 is a front face view of a wedge or key, two or more of which are secured upon the outer periphery of the neck of the can. Fig. 4 is an inner face view of a portion of the cover for the device, illustrating one of the grooved or slotted members adapted to coöperate with the key members to lock the cover on the device.

As shown in the drawings: 1, indicates the outer wall of a container or can, having soldered, welded or riveted thereto, as desired, an inwardly concave bottom 2, and an outwardly convex breast member 3. Mounted within the can is an interior similarly shaped can having side walls 4, an inwardly concave bottom member 5, and a convex breast member 6, similar to the member 3, and adjacent thereto, said respective members 4, 5, and 6, being connected to one another by soldering or other suitable means, as desired. Said breast members 3 and 6, of the outer and inner can members respectively, are closed or joined at their upper margins by the mouthpiece member 7, affording the neck of the assembled structure. Said member 7, at one of its edges extends inwardly beneath the breast 3, and is soldered thereto, and at its other edge, is flanged inwardly over and around an inturned portion of the element 6, thus affording an inner peripheral flange 8, and a continuous groove or recess 8ª, within the can.

A cover 9, adapted to fit over the mouth piece of the can and extend downwardly around the neck thereof, has secured on the under surface thereof an upwardly facing cup 10, which fits within the mouth piece of the device to seal the same. The walls of the cup 10, and the inner walls of the mouthpiece 7, are complementally curved, the convexity of the cup and the concavity of the mouthpiece being spherical and of a radius equal substantially to the mean radius of the opening through the mouthpiece. This affords practically a ball and socket connection and permits the cover to be moved or inclined at different degrees relative to the can without impairing the sealing effect thereof.

Any desired insulating material 11, such as ground cork, felt or the like, is packed in the space between the inner and outer container members and also within the cup 10, secured on the cover, so that a relatively thick wall of insulation entirely surrounds the contents of the can. In order to properly space the inner can from the outer can during the assembly thereof, wood or fiber or other non-conducting materials in the forms of small ring segment blocks 12, are placed on the bottom of the outer can adapting the inner can to rest thereon and to be properly centered prior to the introduction of the insulating packing 11.

For the purpose of closing the cover tightly upon the can, a pair of wedge shaped key members 13, are provided on the outer surface of the neck 7, and are adapted to coöperate with a pair of complemental members 14, having wedge shaped grooves or slots therein and secured on the inner periphery of the outer depending flange of the cover 9, so that after the positioning of the cover upon the device, partial rotation thereof about its vertical axis not only serves to engage the same tightly on the opening in the can, but to retain the same thereon until purposely released by a reverse rotary movement thereof. The purpose of the inturned flange 8, and groove 8ª, on the interior of the mouthpiece, is to receive a card or paper blank 15, thus affording an air space beneath the cover and sealing the contents of the can from dust or other foreign matter which might find its way into the contents of the can when the cover 9, is removed.

A bumper ring 16, is provided around the exterior of the can at the junction of the outer side walls and breast member to reinforce the same and protect the can in handling.

In this invention every precaution has been taken to avoid and prevent a transfer of heat between the inner can and the outer can. Only one metallic connection exists between the aforesaid two elements and this is at the opening or mouthpiece 7. But the conduction of heat even at this point is practically negligible owing to the provision of the air space between the cover cup member 10, and the paper blank 15. Furthermore, the depending flange forming the outer portion of the cover 9, is spaced from the mouthpiece 7, and serves to shield the same from light or heat which would warm this portion, and it being nearest adjacent the inner can, the heat would otherwise be quickly conducted thereto.

I am aware that various details of construction may be varied through a wide range without departing from the principles of this invention. I therefore do not purpose limiting the patent granted otherwise than necessitated by the prior art.

I claim as my invention:

1. In a device of the class described, a can, a mouth-piece, and a cover therefor, said mouth-piece and cover being complementally curved to permit interfitting when the axis of said cover is angled with respect to the axis of said mouth-piece without impairing the sealing effect thereof.

2. A milk can comprising inner and outer walls spaced from one another, a filling of heat insulating material therebetween, a non-conducting cover adapted to close the open end of the device and shaped complementally with said open end to afford an adjustable ball and socket connection, and locking means engaged on the can and cover adapted to coöperate to maintain the cover thereon.

3. In a device of the class described, an inner and outer container spaced one from another, a filling of insulating material therebetween, said inner container at its upper end being flanged inwardly, a mouthpiece secured to said outer container and flanged inwardly over said inturned portion of said inner container affording an inner peripheral groove and flange, and an insulating member sprung into said groove and resting on said flange, affording a closed air space in said mouth-piece.

In testimony whereof I have hereunto subscribed my name in the presence of two subscribing witnesses.

LEE STURGES.

Witnesses:
 CHARLES W. HILLS, Jr.,
 FRANK K. HUDSON.